UNITED STATES PATENT OFFICE.

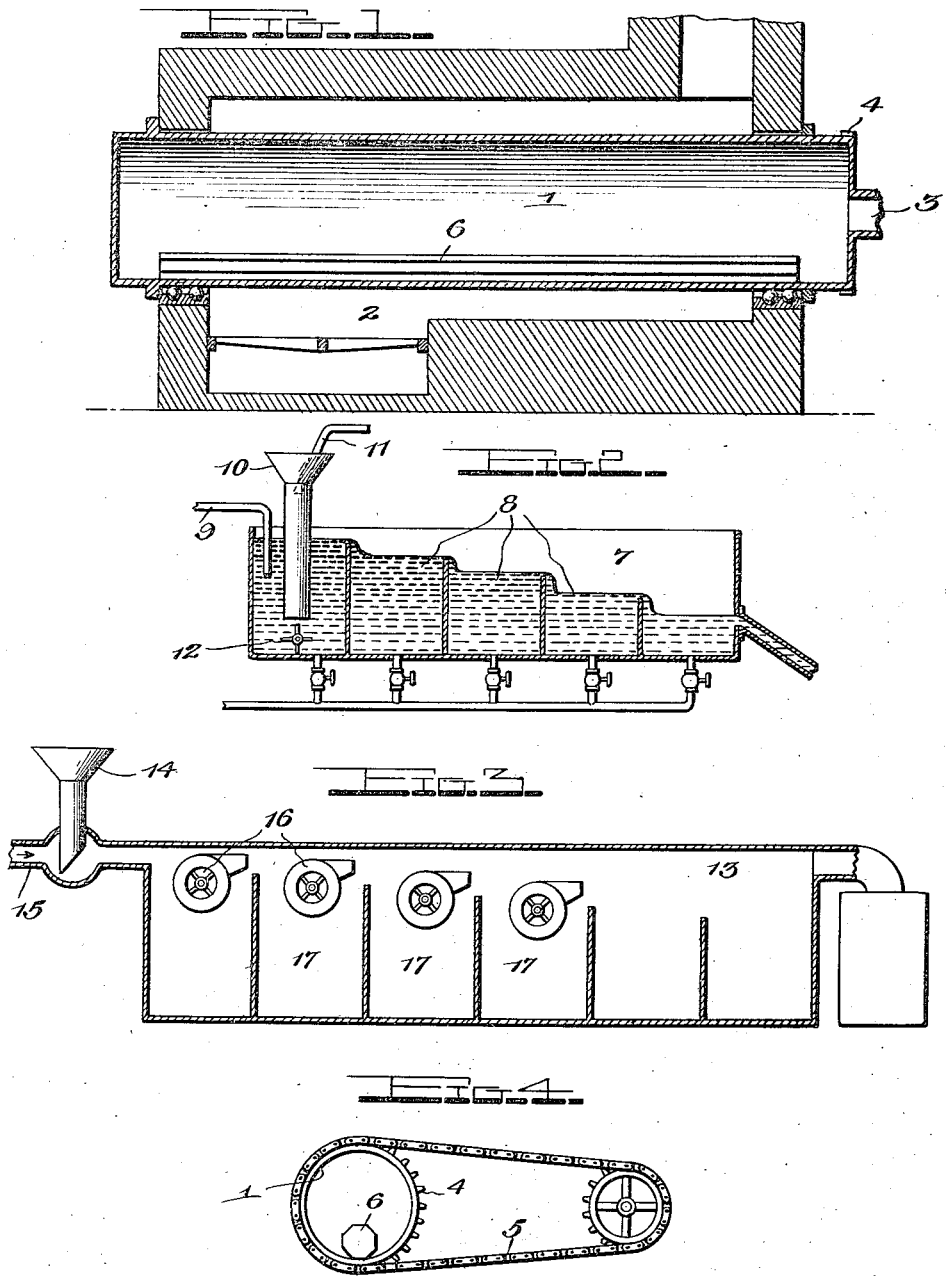

ARDON M. MITCHELL, OF TUCKAHOE, NEW YORK, ASSIGNOR TO MITCHELL & GRENELLE, INC., OF NEW YORK, N. Y.

PROCESS FOR OBTAINING MAGNESIUM OXID FROM DOLOMITE, &c.

1,273,110. Specification of Letters Patent. Patented July 16, 1918.

Application filed March 25, 1916. Serial No. 86,676.

*To all whom it may concern:*

Be it known that I, ARDON M. MITCHELL, a citizen of the United States, residing at Mohegan Heights, Tuckahoe, in the county of Westchester and State of New York, have invented certain new and useful Improvements in Processes for Obtaining Magnesium Oxid from Dolomite, &c., of which the following is a specification.

This invention relates to certain new and useful improvements in process for obtaining magnesium oxid from dolomite or like carbonates.

Magnesium oxid plays a very useful and important part in the manufacture of refractory brick for furnaces and plastics, but is not obtainable in the United States except in the extreme western part. The transportation is, therefore, quite an item in the disposal of this oxid for use.

Dolomite abounds throughout the country and contains much magnesium oxid.

The object of this invention is, therefore, to separate the oxid from the dolomite which latter is composed of carbonates of magnesium and calcium.

A further and equally important aim of the invention resides in the separation of magnesium oxid from dolomite by mechanical means.

The invention further resides in the steps and features hereinafter described and claimed, the means by which I may practice my process being illustrated in the accompanying drawing wherein—

Figure 1 is a longitudinal section of the rotatable cylinder in a heater;

Fig. 2 illustrates a tank containing water for separating the finer particles of magnesium oxid from the coarser calcium carbonate;

Fig. 3 shows another means for effecting separation of the finer from the coarser particles; and Fig. 4 is an end elevation of a slightly modified form of cylinder.

In my improved process, I grind the dolomite to a very fine state of division and then place it in the cylinder 1 which latter is rotatably mounted in the heater 2. This cylinder is closed at one end and provided in its opposite end with an opening 3 to permit of the escape of the carbon dioxid evolved as the dolomite is being heated. Suitable means may be provided for utilizing this gas but as this does not form a part of the invention no means has here been shown.

The dolomite is heated to entirely decompose the magnesium carbonate, which is accomplished at 950° F., and leave the calcium carbonate unaffected in a crystalline state. When heated and simultaneously pulverized the magnesium oxid is liberated from the calcium carbonate on account of the breaking up of the latter from its crystalline form. The cylinder contents are heated to about 1000° F., care being taken not to raise the temperature much above 1200° or 1400° F., because the calcium carbonate begins to decompose at 1600° F. By grinding the calcium carbonate while hot, the particles are more frangible, more easily pulverized and retain less tenaciously the particles of MgO by physical inclosure.

The periphery of the cylinder is provided with a sprocket 4 over which takes a sprocket chain 5 for rotating the cylinder during the heating of its contents. Within the cylinder is disposed an iron bar 6, preferably octagonal in cross section, for tumbling and rolling over the material to further disintegrate the particles of magnesium oxid from the inclosing calcium carbonate which, as previously stated, is not affected by heat under 1600° and retains its original specific gravity.

The next step is to withdraw the contents and place it in water where, by suitable means hereinafter described, the lighter components are carried over into tanks to settle.

The tank 7, shown in Fig. 2, comprises a series of compartments 8 of different depths arranged in progressive order. Water is supplied through pipe 9 and the pulverized material (calcium carbonate and magnesium oxid) is introduced through a hopper 10 and may be urged by an air jet 11. The water is then agitated, as by a beater 12 and by air admitted through pipes discharging upwardly through the bottoms of the compartments, whereby the lighter particles will overflow into the remote compartments and become separated from the coarser particles. By this method the magnesium oxid will become separated in an almost pure state since its specific gravity is much less than that of the calcium carbonate.

In Fig. 3, I have disclosed a pneumatic separator 13 into which the pulverized material is introduced through a hopper 14 the latter emptying into an intake 15 from which the mass is drawn by the fans 16, the finer particles being blown to the more remote of the compartments 17. A very pure state of the oxid is obtainable by this method, and the additional heating and labor in drying, which is necessary in the separation by water, is entirely eliminated.

After the oxid has settled in the water tanks 8, it is withdrawn and introduced into a cylinder, similar to cylinder 1, where it is dried and heated to 1600°, more or less, to evolve any carbon dioxid that may have been absorbed while being manipulated. A tumbler, similar to that within cylinder 1, prevents the contents from caking and further reduces the oxid to greater fineness, this being a very desirable condition for plastics, after which the contents are withdrawn, cooled and prepared for use.

The residue or calcium carbonate may be utilized and treated for various uses.

In Fig. 4, I have depicted an opened cylinder which may be arranged so as to grind the carbonate in water for separating the oxid by flotation, the pulverizer 6 reducing the particles.

Thus, it will be apparent that in addition to pulverizing during the heating of the mass, the latter is rotated and agitated for diffusing the heat more uniformly and for obviating the concentration of heat, applied to some parts of the mass, to a degree sufficiently high to effect decomposition of the calcium carbonate.

What is claimed is:

The process of obtaining magnesium oxid from dolomite which comprises heating the ground dolomite to approximately 1000° F. while tumbling and grinding the same, whereby the magnesium carbonate is decomposed forming magnesium oxid and the calcium carbonate is rendered crystalline and readily separable from the magnesia, separating the calcium carbonate from the magnesia and calcining the latter at a temperature sufficient to expel any carbon dioxid contained therein.

In testimony whereof I affix my signature.

ARDON M. MITCHELL.